Dec. 2, 1969   M. B. SAMPSON ET AL   3,481,612
PISTON RING CONSTRUCTION
Filed Dec. 14, 1967
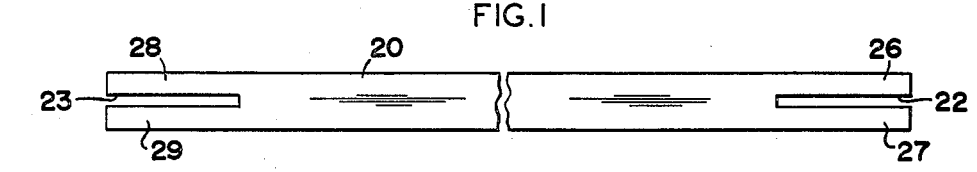
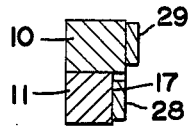
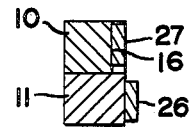
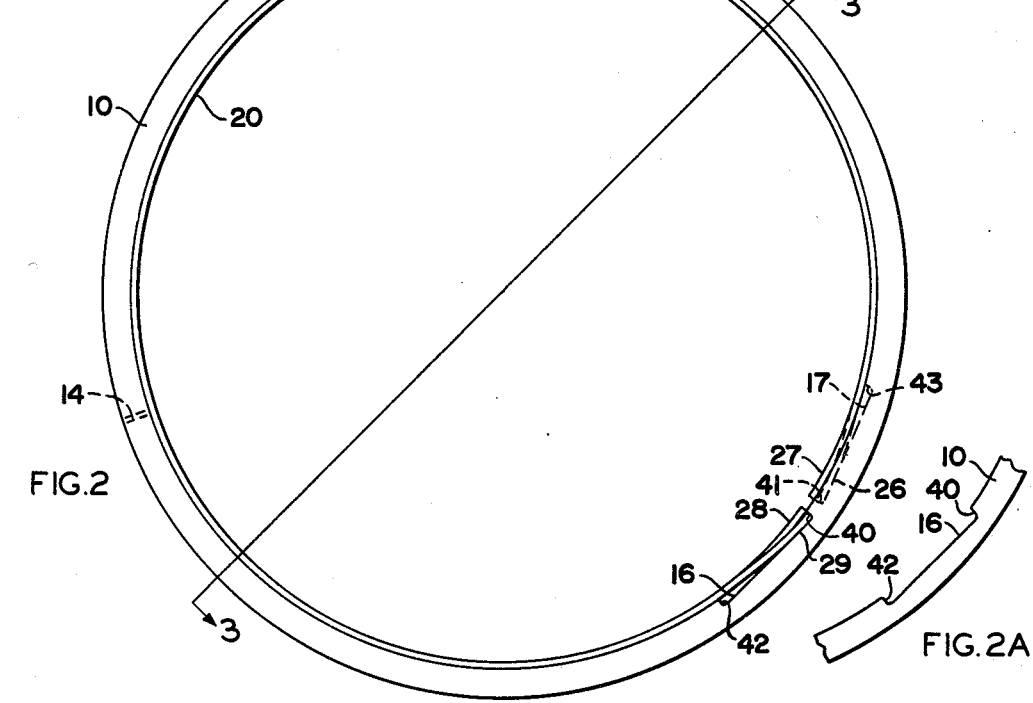
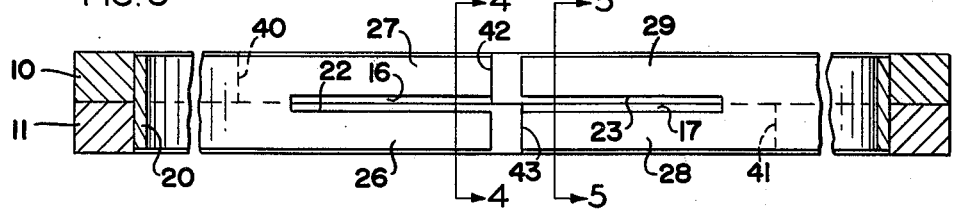
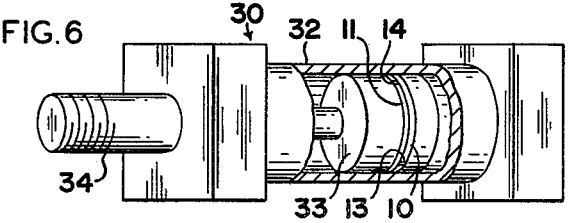
INVENTORS
MERRITT B. SAMPSON
ALAN H. YOUNG
BY
Watts, Hoffmann, Fisher & Heinke
ATTORNEYS.

United States Patent Office 3,481,612
Patented Dec. 2, 1969

3,481,612
PISTON RING CONSTRUCTION
Merritt B. Sampson, Shaker Heights, and Alan H. Young, Solon, Ohio, assignors to The S-P Manufacturing Corporation
Filed Dec. 14, 1967, Ser. No. 690,505
Int. Cl. F16j 9/16, 9/06
U.S. Cl. 277—141                               11 Claims

ABSTRACT OF THE DISCLOSURE

A pair of piston rings, each having a joint and a recess on its inner side spaced from the joint, are disposed side-by-side in a piston ring groove around an expander ring having a pair of finger portions at each end, the fingers of the expander ring are each adapted to be disposed in the associated recesses to limit relative rotation of the rings in the groove and maintain the joints circumferentially spaced from one another.

BACKGROUND OF THE INVENTION

Field of the invention

The present invention relates to piston ring constructions especially suited for fluid cylinders. More particularly, the invention is directed to a piston ring arrangement wherein limited relative rotation is permitted between piston rings.

In reciprocating piston constructions, split piston rings are conventionally positioned in ring grooves in the piston. The rings are maintained in an inwardly compressed condition by the walls of a surrounding cylinder. The compression of the split rings maintains the ends of the rings in substantial abutment.

A problem which has long existed is that of preventing fluid leakage at the joint between the ends of the rings. In such devices as internal combustion engines, the problem is relatively minimal as compared with fluid cylinders. This is true because the piston only reciprocates during use and a staggered relationship of the ring joints established during assembly is maintained.

With fluid cylinders, on the other hand, it is common practice to attach structure to the piston rod by threading a nut or the like on the rod end. This often rotates the rod and the attached piston. The staggered relationship of the piston and expander rings established at assembly is often lost when this occurs. Once this staggered relationship is lost, fluid leaks past the piston.

Description of the prior art

The constructions designed to overcome this joint leakage problem that enjoy the most frequent current usage utilize specially configured overlapping end portions. Typically, these portions are configured such that they overlap both axially and radially. These overlapping portions fatigue in use and break causing premature ring failure.

An early proposal utilized two piston rings placed side-by-side and an inner expander ring having spaced pins extending radially outwardly from it. These pins were to be positioned in joints between the ends of each ring to prevent relative rotation of the rings. This proposal has not enjoyed success for several reasons which include: (1) assembly is difficult; (2) the construction is relatively expensive; and, (3) it is difficult to properly fix a pin to the expander ring without, among other things, weakening the ring, especially if the expander is spring steel.

SUMMARY OF THE INVENTION

The piston ring construction of the present invention permits limited relative rotation of two piston rings placed in side-by-side axially aligned relationship, but prevents the joints or separations at the ends of the piston rings from becoming aligned with one another.

A perferred form of the present invention comprises a pair of piston rings placed side-by-side, each piston ring having a joint or separation at its ends and a recess circumferentially spaced from the joint. An expander ring is surrounded by the two piston rings. The expander ring has a pair of end slots. Each slot extends circumferentially from an end of the expander ring with its sides defined by a pair of fingers. Each finger is adapted to project into a ring recess and engage an end of the recess to limit relative rotation between the piston rings. In this manner, the joint of one piston ring is prevented from becoming aligned with the joint of the other piston ring to inhibit fluids or gases from leaking past the piston rings.

Accordingly, an object of the present invention is to provide a novel and improved piston ring construction in which the joints of piston rings are prevented from becoming aligned with one another.

Other objects and a fuller understanding of the invention may be had by referring to the following detailed specification and claims, taken in conjunction with the accompanying drawing.

DESCRIPTION OF THE DRAWINGS

FIGURE 1 is a fragmented plan view of an extended expander ring;

FIGURE 2 is a plan view of a piston ring assembly including two piston rings and an expander ring;

FIGURE 2A is an enlarged, fragmentary view of a recessed portion of a piston ring of FIGURE 2;

FIGURE 3 is a sectional view as seen from the plane indicated by the line 3—3 of FIGURE 2;

FIGURES 4 and 5 are sectional views as seen from the planes indicated by the lines 4—4 and 5—5 of FIGURE 3 respectively; and, FIGURE 6 is a partly perspective view with parts broken away and removed of a fluid cylinder assembly including the novel piston ring assembly.

DESCRIPTION OF THE PREFERRED EMBODIMENT

Referring now to the drawings, a pair of piston rings 10, 11 are juxtaposed with one another for positioning within a piston groove. The piston rings 10, 11 have separations or joints 13, 14, respectively. The joints 13, 14 are preferably of the butt-type because of its dependability, long life, and relative ease of manufacture. The rings 10, 11 also have recesses 16, 17 circumferentially spaced from the joints 13, 14 respectively. The recesses 16, 17 are respectively formed in the inner sides of the piston rings 10, 11. The recesses 16, 17 have substantially flat inner surfaces as seen most clearly in FIGURE 2A.

The piston rings 10, 11 are of identical construction, but the positions of the recesses 16,17 are reversed so that in a manner to be described presently, each ring overlaps the joint of the other at all times.

An expander ring 20 has spaced, longitudinally aligned slots 22, 23. The slots 22, 23 at the ends of the expander ring 20 form a pair of finger portions 26, 27 at one end and 28, 29 at the other. The expander ring 20 slidably engages inner surfaces of the piston rings 10, 11 and is preferably composed of a spring steel so as to provide substantially uniform outward pressure against the inner surfaces of the piston rings 10, 11 and so that the finger portions 26–29 are biased outwardly against the inner sides of the piston rings 10, 11. The recesses 16, 17 of the piston rings 10, 11 respectively, have a sufficient width and depth so that one finger portion of a pair may project into a recess of one piston ring while the other finger portion of the pair engages the cylindrical inner surface of the other piston ring.

As shown in FIGURES 2, 4 and 5, it is preferred that the expander ring extend around substantially the inner circumference of the piston rings 10, 11 so that a relatively small space remains between pairs of the finger portions 26, 27 and 28, 29. The expander ring 20 may be shorter if desired to permit greater relative rotation of the piston rings 10, 11.

As shown in one limiting position in FIGURE 2, the finger portion 29 is disposed in the slot 16 and abuts one end 40 of it. The finger portion 28 engages the cylindrical inner surface of the piston ring 11. Similarly, the finger portion 26 is disposed in the slot 17 and abuts one end 41 of it, and the finger portion 27 engages the cylindrical inner surface of the piston ring 10. In this position, the joints 13, 14 are circumferentially spaced a maximum distance from one another. Further clockwise rotation of the piston ring 10 relative to the expander ring 20 is prevented by the abutment of the finger portion 29 against the end 40 of the slot 16. The abutment of the finger portion 26 against the end 41 of the slot 17 prevents counterclockwise rotation of the piston ring 11 relative to the expander ring 20.

In FIGURE 3, the piston rings 10, 11 are shown in a second limiting position in which counterclockwise rotation of the piston ring 10 relative to the expander ring 20 is prevented. As shown, the finger portion 27 projects into the recess 16 and abuts an end 42 thereof, and the finger portion 26 engages the cylindrical inner surface of the piston ring 11. Similarly, the finger portion 28 projects into the recess 17 and abuts an end 43 thereof, and the finger portion 29 engages the cylindrical inner surface of the piston ring 10. In this condition, further movement of the piston ring 10 counterclockwise in the orientation of FIGURE 2 relative to the expander ring 20 is prevented by the abutment of the finger portion 27 against the end 42 of the recess 16. The abutment of the finger portion 28 against the end 43 of the recess 17 prevents clockwise movement of the piston ring 11 relative to the expander ring 20. The joints 13, 14 are now circumferentially spaced a minimum distance from one another.

Between the two limiting positions of the piston rings 10, 11 the finger portions 26–29 move in a manner which will now be described. For example, with the piston rings 10, 11 in a condition as shown in FIGURE 2, the piston ring 10 may be rotated counterclockwise relative to the expander ring 20. In doing so, the finger portion 29 will be cammed out of the recess 16 by the piston ring 10. Counterclockwise rotation of the piston ring 10 relative to the expander ring 20 may continue until the finger 27 projects into the recess 16 and engages the end 42. Similarly, the finger portion 26 will be cammed out of the recess 17 by the piston ring 11 if it is rotated clockwise from the FIGURE 2 position. Upon further clockwise rotation, the finger portion 28 will move into the slot 17 and abut the end 43 of the slot 17 preventing further clockwise rotation of the piston ring 11 relative to the expander ring 20.

In use, the novel piston ring assembly is positioned in a piston ring groove and is especially advantageous in applications where the piston is likely to be rotated. One such application is shown in the fluid cylinder unit 30 shown in FIGURE 6. The unit 30 includes a cylinder 32, a piston 33 adapted to reciprocate within the cylinder, and a piston rod 34 connected to the piston 33. The rings 10, 11, 20 are in conventional ring groove in the piston 33 and are adapted to slidably engage the inner surface of the cylinder 32. The piston rod 34 includes threads on its external end for attaching a fixture. When the operator threads a nut on the piston rod 34, rotation of the piston 33 and piston rings 10, 11 results. With ordinary piston rings, the rings could rotate relative to one another until the joints become aligned. This results in leakage of fluid past the rings. In contrast, the expander ring 20 prevents the alignment of the joints 13, 14 so that leakage due to alignment cannot occur.

With the example shown, the piston rings 10, 11 may be rotated relative to one another a distance slightly more than the circumferential length of the slots 16, 17. This is assuming that the ring 20 extends approximately around the entire circumference of the piston ring groove.

The joints 13, 14 are thus maintained in circumferentially spaced relationship at all times with their inner ends sealed by the expander ring to prevent leakage radially inwardly into the ring groove. To effectively accomplish this sealing, the expander ring 20 has a dimension axial of the piston, substantially equal to the combined axial dimension of the piston rings 10, 11.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. In a piston and cylinder mechanism an improved piston ring assembly comprising:
   (a) a first piston ring having a joint;
   (b) a second piston ring juxtaposed with said first piston ring, said second piston ring having a joint circumferentially spaced from the joint of said first piston ring;
   (c) an expander ring surrounded by said first and second piston rings;
   (d) coactable means on said first and second piston rings and on said expander ring for permitting limited relative rotation of said first and second rings in a range while maintaining the piston ring joints circumferentially spaced from one another; and,
   (e) said coactable means permitting assembly of said piston and expander rings in any relative circumferential orientation and thereafter being on relative rotation of the rings into the range of said permitted relative rotation, self-orienting to thereafter retain the rings in said range.

2. The assembly of claim 1 wherein said coactable means includes finger portions on the expander ring.

3. A piston ring assembly comprising:
   (a) a first piston ring having a first joint and having a recess in its inner side spaced from the joint;
   (b) a second piston ring having a second point and having a recess in its inner side spaced from the second joint, said second piston ring juxtaposed with said first piston ring;
   (c) an expander ring surrounded by said first and second piston rings and including a pair of extended portions at each end adapted to be positioned in the recesses in said first and second piston rings; and
   (d) said first and second piston rings and expander ring constructed and arranged such that limited rotation of said first piston ring relative to said second piston ring is permitted with the joints remaining circumferentially spaced.

4. The assembly of claim 3 wherein said recesses are slots axially aligned with said rings.

5. The device of claim 3 wherein said expander ring is an elongated strip of spring steel shorter than the circumference of said first and second piston rings and having a slot at each end defined by a pair of finger portions.

6. A piston ring assembly comprising:
   (a) a first piston ring having a first recess in its inner side and a joint spaced from said recess;
   (b) a second piston ring having a second recess in its inner side and a joint spaced from said second recess, said second piston ring juxtaposed with said first piston ring and said joints circumferentially spaced from one another; and,
   (c) an expander ring engaging the inner surfaces of said first and second piston rings, said expander ring including a pair of finger portions at each end, each of which may be positioned in a recess so that limited relative rotation is permitted between said first and second piston rings and so that a lap always remains between said joints.

7. The assembly of claim 6 wherein said expander ring is a strip of spring steel having a slot at each end forming said finger portions.

8. The assembly of claim 6 wherein the recesses are axially aligned with said piston rings.

9. A piston ring assembly comprising:
   (a) a first piston ring having a first joint and having an axially aligned recess in its inner side spaced from said joint;
   (b) a second piston ring juxtaposed with said first piston ring having a second joint and having an axially aligned recess in its inner side spaced from the second joint;
   (c) an expander ring of spring steel slidably engaging inner surfaces of said first and second piston rings; and,
   (d) said expander ring including a pair of finger portions at its opposite ends, said finger portions adapted to abut ends of said recesses to permit limited relative rotation of said first and second piston rings while said first and second joints remain spaced from one another.

10. A fluid cylinder assembly comprising:
    (a) a cylinder;
    (b) a piston within the cylinder, said piston having a ring groove;
    (c) a piston ring assembly positioned in said ring groove for sliding engagement with said cylinder, said piston ring assembly comprising:
        (i) a first piston ring having a joint;
        (ii) a second piston ring juxtaposed with said first piston ring, said second piston ring having a joint circumferentially spaced from the joint of said first piston ring;
        (iii) means on said first and second piston rings coactable with means on said expander ring for permitting limited relative rotation of said first and second piston rings while maintaining the joints circumferentially spaced from one another.

11. The device of claim 10 wherein said means on said first and second piston rings are recesses and said means on said expander ring are finger portions formed by slots in the ends of said expander ring.

References Cited
UNITED STATES PATENTS

| | | | |
|---|---|---|---|
| 2,220,948 | 11/1940 | Paton | 277—141 |
| 2,879,117 | 3/1959 | Ellis | 277—141 X |
| 3,391,943 | 7/1968 | Riley | 277—141 X |

FOREIGN PATENTS 218,958  4/1942  Switzerland.

LOUIS K. RIMRODT, Primary Examiner